Feb. 24, 1942.  A. E. DRISSNER ET AL  2,273,845
INDEXABLE REVERSIBLE CHUCK MECHANISM
Filed Jan. 30, 1940    3 Sheets-Sheet 3
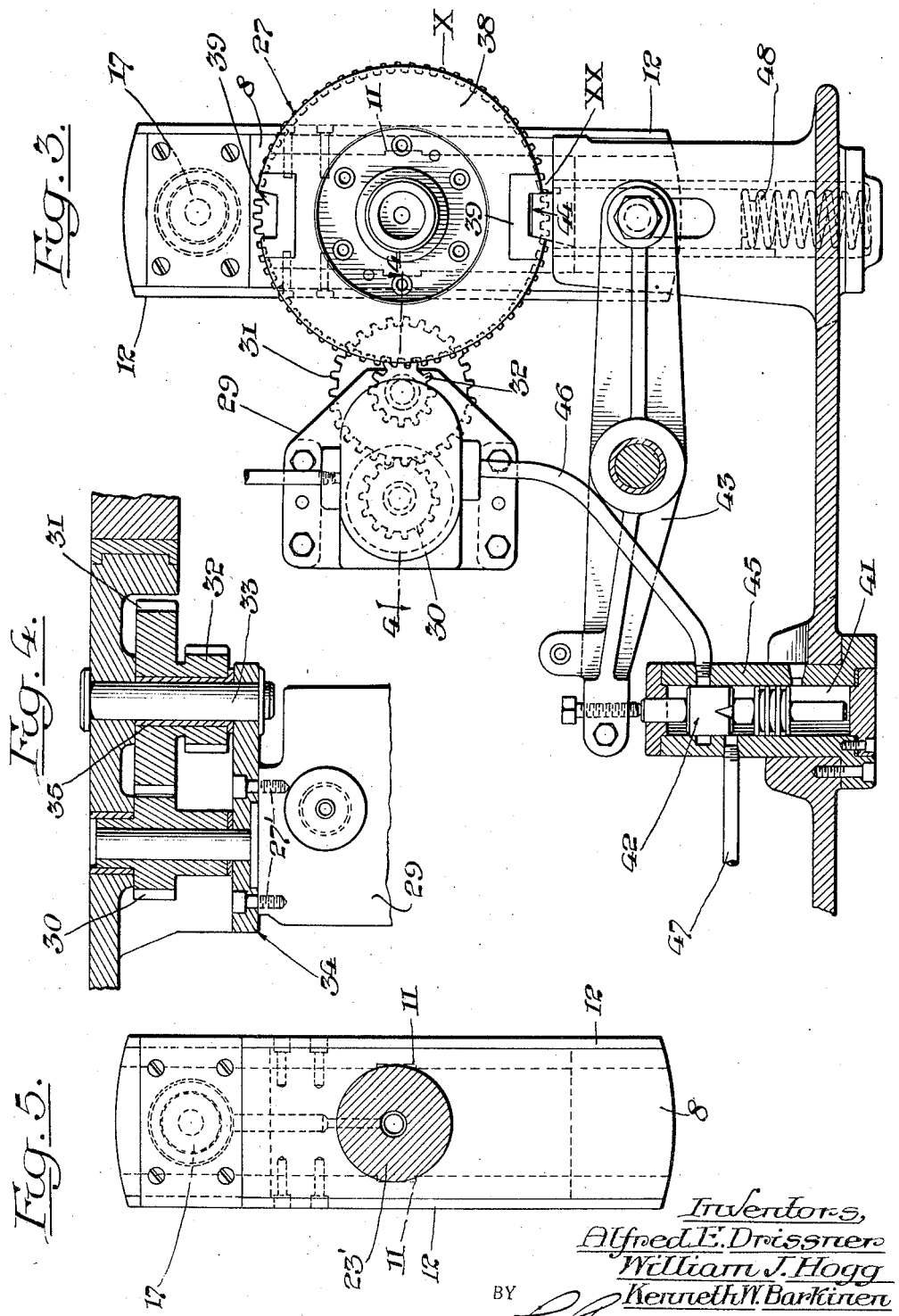
Inventors,
Alfred E. Drissner
William J. Hogg
Kenneth W. Barkinen
BY
ATTORNEY.

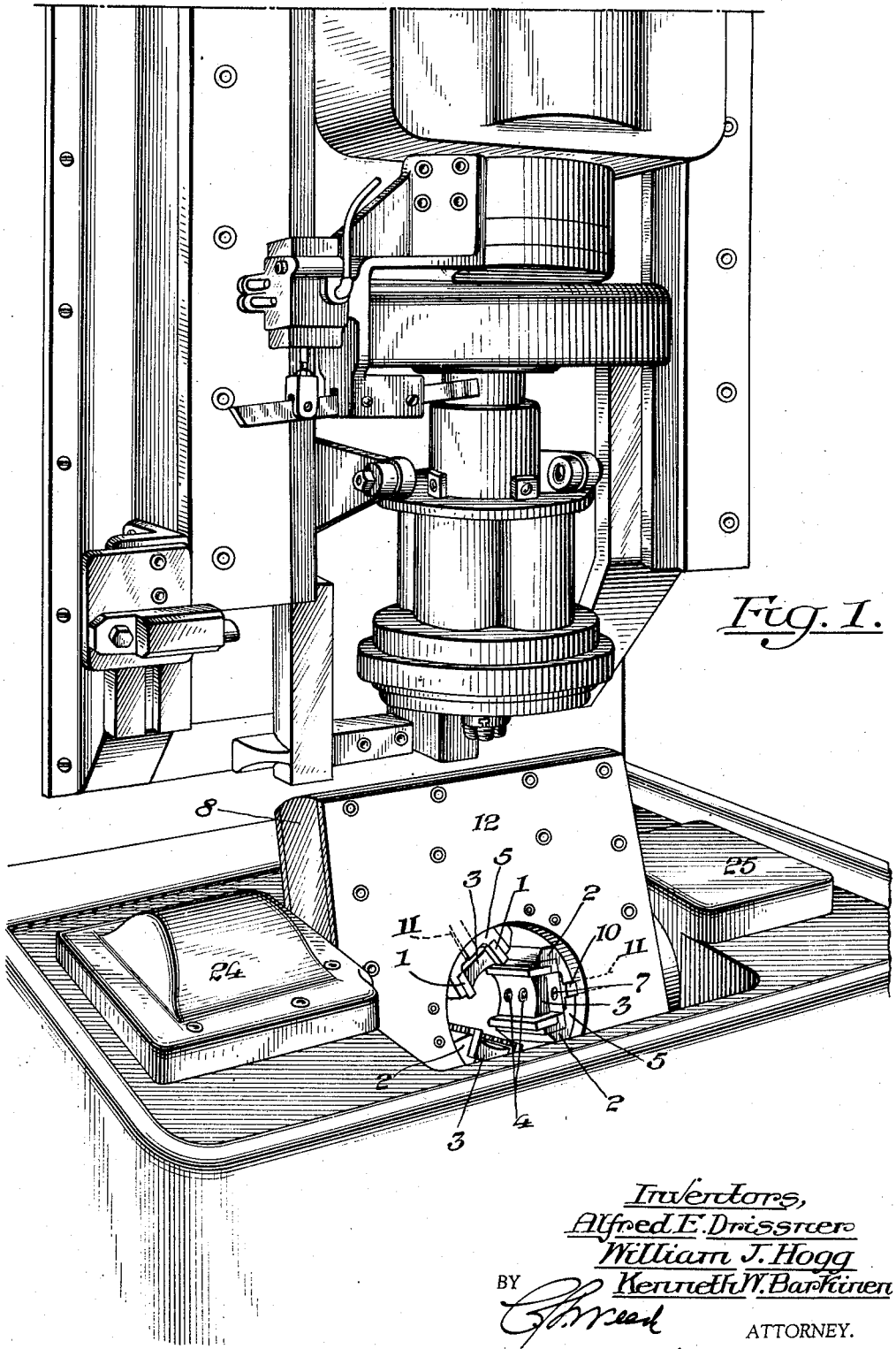

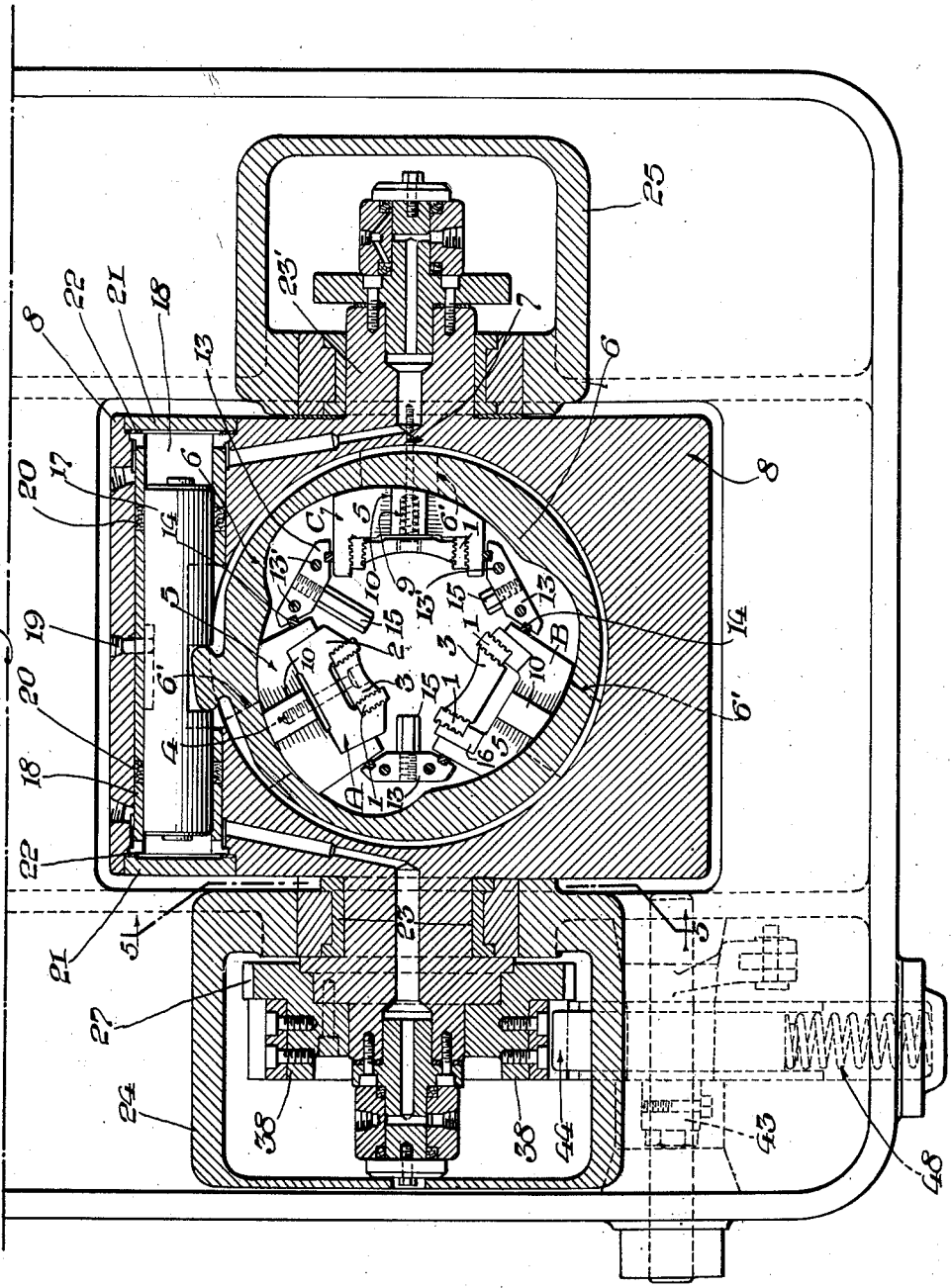

UNITED STATES PATENT OFFICE 2,273,845

INDEXABLE REVERSIBLE CHUCK MECHANISM

Alfred E. Drissner, William J. Hogg, and Kenneth W. Barkinen, Cleveland, Ohio, assignors to The National Acme Company, Cleveland, Ohio, a corporation of Ohio Application January 30, 1940, Serial No. 316,320

25 Claims. (Cl. 10—107)

This invention relates to chucking mechanism and particularly to an indexable reversible chucking mechanism adapted for use with threading machines such as tapping machines in which a lead screw is used for feeding the tap, or vertical boring machines in which a hydraulic piston is used to control the feed of the boring tool, the present application being a division in part and continuation in part of application, Serial Number 228,318, filed September 3rd, 1938, now Patent No. 2,206,031, dated July 2nd, 1940, covering an improvement in "Pipe coupling tapping machines."

An object of the invention is the provision of an improved chucking mechanism especially adapted for pipe couplings or sleeves and similar articles in which, after one end of the coupling has been formed or tapped, it will be automatically indexed and reversed to permit the other end to be formed or tapped without the necessity of opening the chuck holding the work or coupling and which is accomplished by a simple rotation or indexing of the chuck without any sliding movement of the chuck to clear the tap or boring tool, thus maintaining the coupling in positive position and perfect alignment at all times with the tool spindle, and which is simple in construction and operation and operative at a high degree of efficiency to provide couplings with very accurate bores or threads both as to the shape of the thread and diameter and lead thereof.

A further object of the invention is the provision of a fluid operated indexable chuck mechanism whereby the chuck may be automatically rotated 180 degrees to operate on both ends of the work without removing the work from or reversing it in the chuck.

In the present machine, the work is clamped by a fluid operated indexable chuck having interchangeable gripping shoes for different sizes of couplings as well as wall thicknesses thereof, the chuck being so mounted that it is automatically indexed and locked positively to insure alignment with the tool spindle whereby one end of the work may be operated upon, then indexed and the other end worked upon without opening the chuck, all accomplished by a simple automatic rotation of the chuck, thereby increasing production and insuring greater accuracy as well as better alignment of the opposite ends of the work.

In the drawings accompanying and forming a part of this specification,

Fig. 1 is a perspective view of the present improvement applied, for instance, to a tapping machine.

Fig. 2 is a horizontal sectional view of the chuck mechanism shown in Fig. 1.

Fig. 3 is an end, partly sectional view of the chuck mechanism shown in Fig. 2.

Fig. 4 is a horizontal sectional view taken on line 4—4 of Fig. 3, and

Fig. 5 is a detail partly sectional view of Fig. 2 on the line 5—5.

Similar characters of reference indicate corresponding parts in the several views.

Before explaining in detail the present improvement and mode of operation thereof, we desire to have it understood that the invention is not limited to the details of construction and arrangement of parts illustrated in the accompanying drawings since the invention is capable of other embodiments, and that the phraseology employed is for the purpose of description and not of limitation.

The chuck for clamping the work is mounted on two end bearings in the base of the machine so that it may be rotated and thus indexed axially or endwise reversed. For instance, when one side of the work such as a coupling is bored or tapped, the chuck will be reversed, that is, indexed 180 degrees to bring the other end or opening of the coupling in line with the tool. This indexing is controlled by a locking bolt which insures perfect alignment of the chuck when indexed.

The chuck comprises three sets of equally spaced grips 1 for holding the work. Fig. 2 shows three different jaw arrangements—that designated at A is for small-diameter work, that designated at B is for medium-diameter work and that designated by C is for large-diameter work—and also shows three different lengths of stops or stop screws to correspond with their particular jaws. It is understood, of course, that all three jaws and stop screws must be alike for each individual job.

The grips 1, when the jaw is in the form shown at A, Fig. 2, are held firmly in the jaw 2 by a wedge 3, which wedge is tightened down by screws 4 entering tapped holes in the jaw block 5.

The blocks 5 are arranged to slide radially inwardly and outwardly toward and from the chuck center by means of a circumferentially oscillating cam 6, this cam being provided with suitable rises, three in number, equally spaced circumferentially, there being one for each block 5. Each block 5 is held snugly against the cam 6 by screws 7 entering tapped holes in the chuck body 8. The cam 6 moves circumferentially to actuate the blocks 5 radially toward the chuck center and in order to hold the blocks 5 snugly against the cam, each block is provided with counterbored holes to receive springs 9 located on the screws 7 and acting between the head of the screws 7 and the bottom of the counterbored holes. Elongated slots 6' are provided in the cams 6 for screw clearance during oscillation.

Each block 5 is provided with guide tongues 10 on two sides which register with slots 11 in the side plates 12 of the chuck. Blocks 13 are provided to retain felt seals 14 which act to prevent chips from entering the cavity behind the blocks 13 and impairing the surface of the cam 6. These blocks 13 are held in position by screws 13' passing through the plates 12. Stop devices or screws 15 are carried by the blocks 13 for locating the work in the chuck and also to release the work therefrom in the event the work sticks in the grips during their backward movement.

In the jaw construction shown at B, the jaw 2 is replaced by filler blocks 16 and in the construction shown at C, neither the jaw 2 nor filler blocks 16 is used. The cam 6 fits snugly in the chuck body 8 and is held therein by the plates 12 and this cam has an extended portion fitting into a slot in a hydraulic piston 17 which oscillates the cam. This piston 17 moves in a cylinder 18 and is held in proper alignment with the cam 6 by a guide screw 19 carried by the body 8 and extending into a slot in the piston 17. The cylinder 18 is pressed into the body 8 and is provided with packing glands 20 and both ends of the cylinder are closed by end plates 21 and gaskets 22.

The body 8 of the chuck is provided with bushings 23 for the reception of chuck trunnions 23' and these bushings are supported in the base of the machine, rotating therein, and to facilitate assembly of the body 8 into this base, the bottom supports are semi-circular, thus enabling the body of the chuck to be lowered into its base, being held in place by covers 24 and 25 (Fig. 1) suitably secured to the base of the machine by screws, which covers are likewise provided with semi-circular supports for the trunnion bushings.

For indexing the chuck, an indexing gear 27 is secured to one of the trunnions of the chuck body by suitable screws. This indexing gear is driven by a hydraulic motor 29 through gears 30, 31 and 32, the gear 32 meshing with the indexing gear 27. The gears 31 and 32 rotate on an idler shaft 33 supported on one end by the frame of the machine and on the other end by a plate 34 secured to the frame by suitable screws. A suitable bushing 35 is pressed into the gears 31 and 32. The gear 30 is keyed to the shaft of the hydraulic motor 29 secured to the plate 34 by suitable screws 27'. The indexing gear 27 has associated therewith an index disk 38 having suitable lock bolt recesses or seats 39 secured thereto.

The hydraulic motor is put into motion and then stopped in much the same manner as in the single spindle machine shown and described in the co-pending application of Drissner and Barkinen, Serial Number 304,319, filed November 14th, 1939, for indexing the turret slide.

When hydraulic pressure is applied in the valve chamber 41 (Fig. 3), the piston 42 actuates the lever 43, thereby drawing the bolt 44 out of one of the seats 39 of the locking disk 38. When this bolt has moved sufficiently to clear the disk 38, the piston 42 will have moved far enough to open the oil passage through the cylinder 45, permitting the oil to pass from the hydraulic pump through the motor 29, thence through the line 46 and cylinder 45 to the line 47 and back to the reservoir. This places the motor 29 in operation so that the gears 30, 31, 32 and 27 will index the chuck 180 degrees, whereupon it will again be locked by the bolt 44.

During the indexing of the chuck and at a predetermined point, the pressure in the chamber 41 is released and this causes the spring 48 to force the lock bolt 44 against the outside periphery of the disk 38. The periphery of this disk 38 is not a true circle but drops radially inwardly from X to XX and as the bolt 44 rides thereon, the oil passage through the cylinder 45 is gradually stopped until the bolt has dropped into its seat which will then close the oil passage completely thereby stopping the motor 29 at the conclusion of the indexing. By the gradual closing of the oil passage through the cylinder 45, the index motion is slowed down to permit the bolt 44 gently to drop into its seat 39.

The unlocking of the chuck and its subsequent indexing, when applied to a tap or boring machine, may be accomplished when the tool spindle is moving upwardly and at the top of its upward movement engages a suitable valve to direct oil to the piston 42 thereby unlocking the chuck and permitting the oil to flow through the hydraulic motor to index the chuck, as hereinbefore described. However, this unlocking and reversal of the chuck may be controlled by means other than the spindle movement as by means of any moving part of the machine such as a lever or slide or a cam on a rotating shaft or this indexing may be hand controlled as by means of suitable hand levers on the machine.

In the present instance, the chuck is hydraulically operated and controlled by means of levers such as are shown at 1' and 3' of said patent hereinbefore referred to and the operation of which is described on pages 3 and 4 of said patent and which it is unnecessary to repeat herein since, obviously, the chuck opening and closing means, the chuck indexing means and the chuck locking means are not only automatically operative but operative in proper sequence. That is to say, the chuck is not opened or closed during its indexing movement and it is locked prior to its indexing movement. In fact, the parts are so interconnected that the operation of one prevents operation of the other.

It is to be understood that, by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made or all of the modes of its use, we claim:

1. Chucking mechanism comprising a permanently positioned work holding axially supported chuck, automatically operative means for reversing the chuck end for end on its own axis 180 degrees without otherwise shifting it, means for locking the chuck in its indexed position, and means for opening and closing the chuck, both said last means automatically operative in predetermined sequence.

2. The structure of claim 1 in which the means for reversing the chuck is fluid controlled.

3. The structure of claim 1 in which the means for locking the chuck is fluid controlled.

4. The structure of claim 1 in which the means for opening and closing the chuck is fluid controlled.

5. The structure of claim 1 in which the means for reversing and the means for locking the chuck are fluid controlled.

6. The structure of claim 1 in which the means for reversing and the means for opening and closing the chuck are fluid controlled.

7. The structure of claim 1 in which the means for locking the chuck and the means for opening and closing the chuck are fluid controlled.

8. The structure of claim 1 in which each of said means is fluid controlled.

9. The structure of claim 1 in which the means for indexing the chuck comprises a system of gears cooperating with a chuck-carrying gear having a lock bolt disk connected therewith.

10. The structure of claim 1 in which the means for indexing the chuck comprises a system of gears and a hydraulic motor for controlling the operation of said gears.

11. The structure of claim 1 in which the chuck comprises a plurality of cam operated chuck jaws.

12. The structure of claim 1 in which the chuck comprises a plurality of jaws and a circumferentially shiftable cam for operating said jaws.

13. The structure of claim 1 in which each of said means is fluid controlled and the chuck comprises a plurality of circumferentially shiftable cam operated chuck jaws.

14. The structure of claim 1 in which each of said means is fluid controlled through the medium of a hydraulically operated pump, and a piston valve controls the operation of the locking means and the indexing means.

15. Chucking mechanism comprising a permanently positioned work holding axially supported chuck comprising a plurality of radially shiftable jaws and an oscillating cam ring encircling said jaws and having cam surfaces formed on the inner face thereof to engage and shift the jaws, automatically operative means for indexing the chuck on its own axis 180 degrees without otherwise shifting it, automatically operative means for locking the chuck in its indexed position, and fluid controlled means for opening and closing the chuck and comprising a piston for oscillating said cam ring, and means for controlling the operation of said piston.

16. The structure of claim 15 in which the chuck comprises a series of radially shiftable and interchangeable chuck jaws in cooperative engagement with said cam.

17. The structure of claim 1 in which the chuck comprises a plurality of interchangeable chuck jaws whereby larger or smaller work may be chucked by the same chuck.

18. The structure of claim 1 in which the locking means comprises a disk or circular formed locking member having a bolt seat, the periphery of said disk adjacent to the seat tapering toward said seat.

19. Locking means for an indexable member comprising a disk or circular-formed member having one or more lock bolt seats, the periphery of said disk adjacent to the seat tapering toward its seat, and a locking bolt adapted to ride on said tapered surface prior to reaching its seat.

20. Chucking mechanism adapted for use in a machine having a base and a reciprocating tool carrying spindle and comprising a single indexable permanently positioned work holding axially supported chuck mounted in said base, automatically operative means for reversing the chuck end for end on its own axis without otherwise shifting it, automatically operative locking means for the chuck, and a hydraulically operated reciprocating piston for opening the chuck on the movement of the piston in one direction and for closing the chuck on the movement of the piston in the opposite direction.

21. The structure of claim 20 in which said locking and reversing means are controlled in predetermined sequence through the medium of a hydraulically operated motor.

22. The structure of claim 20 in which the chuck comprises a plurality of interchangeable chuck jaws whereby larger or smaller work may be chucked by the same chuck.

23. The structure of claim 20 in which fluid operated means connects the reversing and locking means and is operative on the release of the locking means to operate the reversing means and also operative on the reversal of the chuck to control the operation of the locking means.

24. Chucking mechanism comprising a permanently positioned work holding axially supported chuck, automatically operative means for reversing the chuck end for end on its own axis 180 degrees without otherwise shifting it, means for locking the chuck in its indexed position, said reversing and locking means interconnected whereby operation of one controls the operation of the other, and means for opening and closing the chuck, said locking means and chuck opening and closing means automatically operative in predetermined sequence.

25. The structure of claim 24 in which said chuck opening means is independent of the reversing means but interconnected so that the operation of one prevents operation of the other.

ALFRED E. DRISSNER.
WILLIAM J. HOGG.
KENNETH W. BARKINEN.